United States Patent [19]

Briggs

[11] 4,377,220

[45] Mar. 22, 1983

[54] AUTOMATIC RAIL CLAMP

[75] Inventor: Aubrey C. Briggs, Carnegie, Pa.

[73] Assignee: Dravo Corporation, Pittsburgh, Pa.

[21] Appl. No.: 152,136

[22] Filed: May 21, 1980

[51] Int. Cl.³ ............................................. B61H 7/12
[52] U.S. Cl. ..................................... 188/44; 188/43
[58] Field of Search ................. 188/1.11, 41, 43, 72.9, 188/75, 167, 170, 196 R, 196 BA, 196 V, 201, 44, 45

[56] References Cited

U.S. PATENT DOCUMENTS

| | | | |
|---|---|---|---|
| 1,793,470 | 2/1931 | Enderby | 188/196 BA |
| 2,379,796 | 7/1945 | Freeman et al. | 188/196 BA |
| 2,856,030 | 10/1958 | Snow | 188/170 |
| 3,948,360 | 4/1976 | Pollinger et al. | 188/1.11 |
| 3,968,864 | 7/1976 | Deichsel et al. | 188/170 |
| 4,136,634 | 1/1979 | Wilson | 188/1.11 |
| 4,236,608 | 12/1980 | Kobelt | 188/43 |

FOREIGN PATENT DOCUMENTS

| | | | |
|---|---|---|---|
| 1050795 | 2/1959 | Fed. Rep. of Germany | 188/1.11 |
| 352748 | 9/1937 | Italy | 188/43 |
| 453153 | 9/1936 | United Kingdom . | |
| 532219 | 1/1941 | United Kingdom . | |
| 1065926 | 4/1967 | United Kingdom . | |

Primary Examiner—Douglas C. Butler
Attorney, Agent, or Firm—Parmelee, Miller, Welsh & Kratz

[57] ABSTRACT

An automatic rail clamp is provided with an indicator for visibly showing the extent of wear of the replaceable clamping jaw inserts together with a fulcrum shaft having opposed eccentrics about which the jaws rock. As wear of the inserts develops, rotation of the fulcrum shaft is effected in measured increments which, in turn, progressively shifts the eccentrics relative to the axis of rotation of the fulcrum shaft to thereby move the centers about which the jaws pivot. This operates to maintain the arc through which the jaws rock within a constant range, thus allowing the rail clamp mechanism to operate at smaller, more efficient toggle angles by keeping the toggle angle safe. A differential hand screw is provided for moving the jaws in the event of failure of the automatic mechanism for opening and closing the jaws to ease the manual effort required to turn the hand screw, particularly to release the jaws when the clamp is set by spring pressure into clamping engagement with the rail.

9 Claims, 9 Drawing Figures

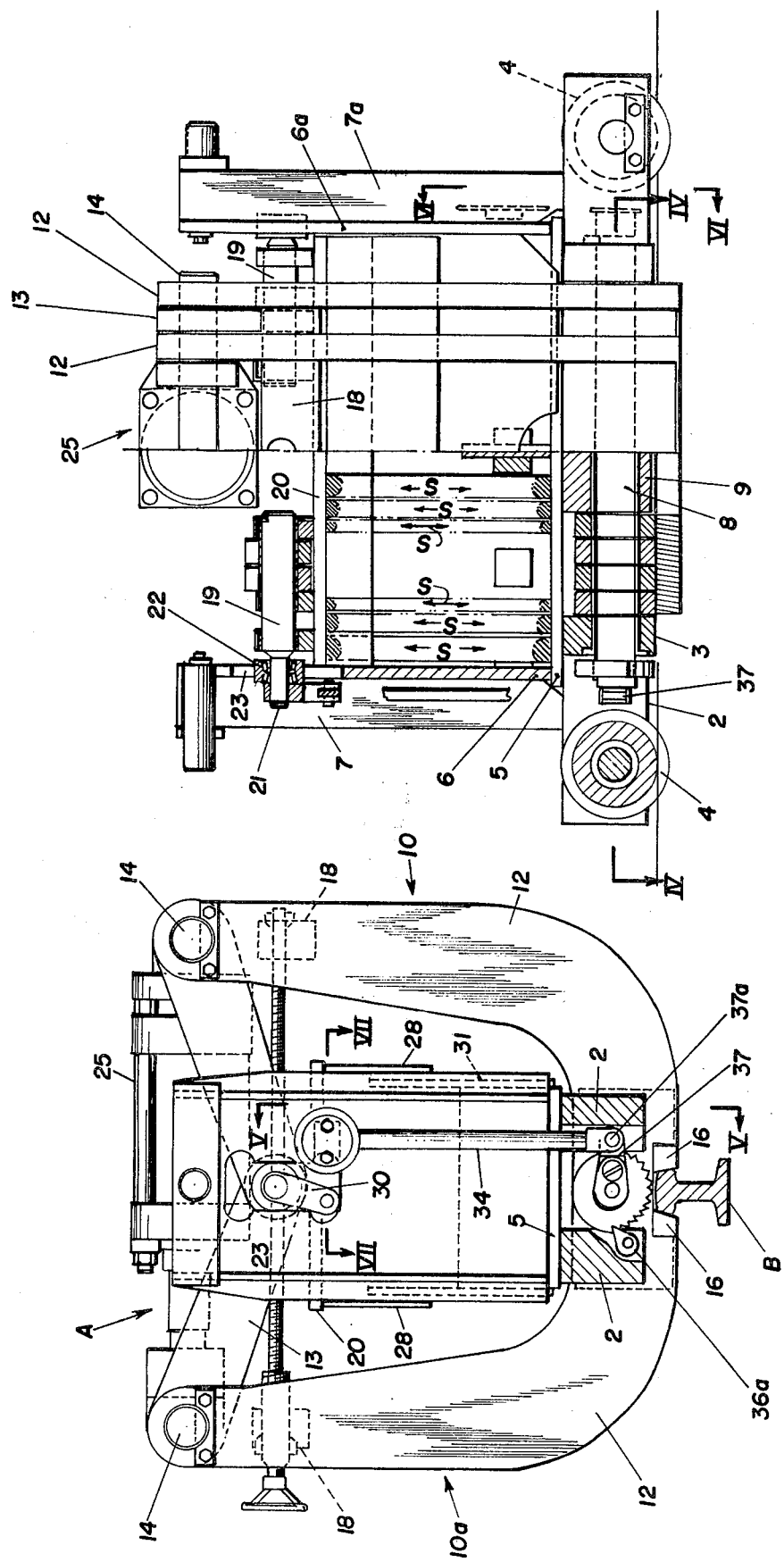

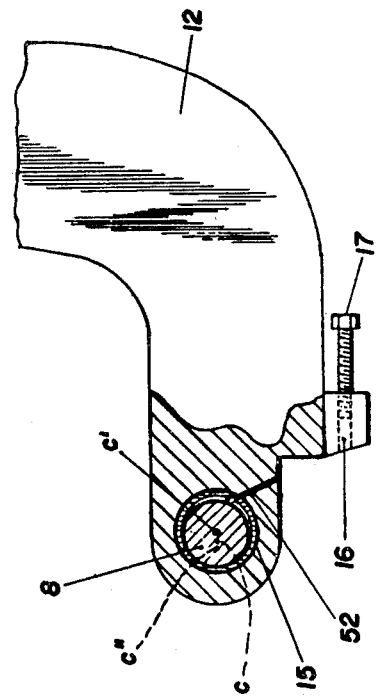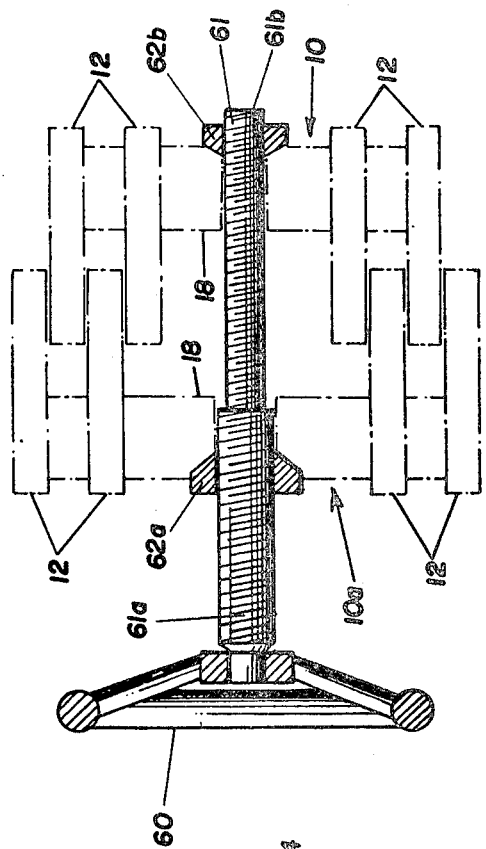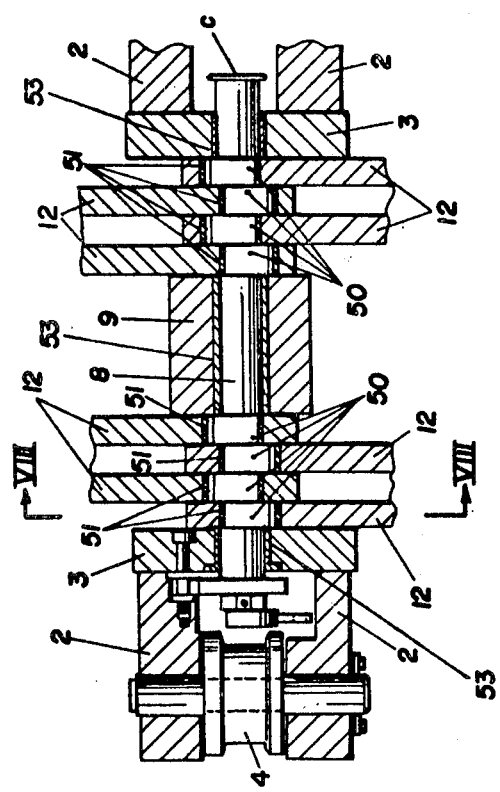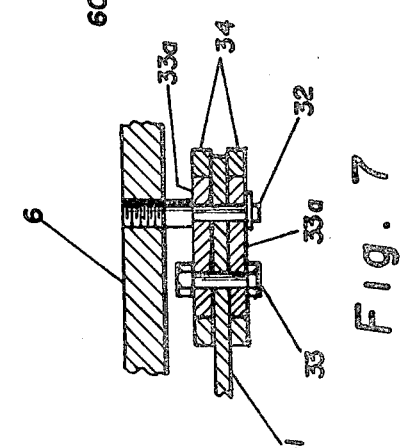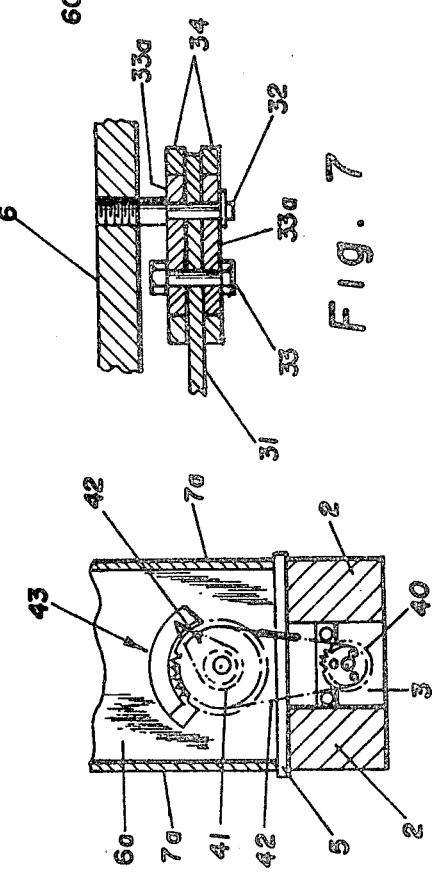

AUTOMATIC RAIL CLAMP

This invention is for an improvement in automatic rail clamps used to prevent the travel or drift of power operated vehicles. Such clamps are known and widely used on power operated vehicles, particularly massive structures that travel on steel rails, that is, structures such as gantry cranes, derricks, ship unloading equipment, traveling bridge cranes and the like, for which the term "gantry" may be used sometimes herein as a generic term. They are arranged on the vehicle to grip both sides of the head of a steel rail when the gantry must be held against unwanted movement from a fixed position, such as may otherwise occur by wind or perhaps in some cases by gravity or thrust resulting from the operation of the equipment in material handling.

BACKGROUND OF THE INVENTION

Clamps of this type generally embody opposed levers of the first class with a common fulcrum near the railhead gripping jaws of the levers in pincer-like fashion but, unlike common pincers, the levers do not cross each other at the pivot. A hydraulic cylinder and piston is arranged to pull the longer arms of the opposed levers toward each other and thereby move the jaws apart to release the clamp from its grip on the railhead. This happens when the motors which drive the gantry are energized to move the gantry. The longer arms of the levers are connected by a toggle link, the common pivot for which is forced down when the levers are pulled together by the hydraulic unit. This downward travel of the toggle pin is opposed by springs so that when pressure falls in the hydraulic system, as when the gantry is stopped at a selected location, the springs act against the toggle pin and links in the opposite direction to move the levers apart and "set" the jaws against the railhead.

Under the conditions of use where stopping and starting occurs many times in a day and with the massive equipment involved, the clamping surfaces of these clamping jaws are provided with railhead-contacting inserts to protect the jaws themselves from the rapid wear to which they would otherwise be subjected. These inserts wear relatively rapidly but they are removably held in the jaws by bolts and they are replaceable, but adjustment of the jaws for wear of the inserts can only be done when the clamp is set and the gantry secure against motion and is difficult to accomplish. There is no way to readily indicate the amount of wear of the inserts that has taken place or take steps to make adjustment, and there is no ready way to determine when wear has become so extensive as to require replacement of the inserts.

It may also happen that, for some reason, the hydraulic pump may fail to release the clamp and the massive and expensive equipment must stand idle, and urgent and costly work may be delayed while workmen try to release the clamp or repair the hydraulic system or, perhaps, the circuits that control its operation.

A primary object of the present invention is to provide an automatic adjustment for wear in the clamp inserts and, at the same time, disclose on an easily visible scale the total extent of wear that has taken place and thus allow for the use of the gantry to be scheduled for the replacement of the inserts when needed.

A second important object of the present invention is to provide manually operable means for operating the clamping jaws if the hydraulic system does not function so that the gantry may be moved from one position and clamped without having to immobilize the gantry for long periods of time while the trouble with the hydraulic system is located and repaired.

Briefly, these objects are achieved with only relatively inexpensive changes in clamps of this type now in use, of which one manufactured by my assignee, Dravo Corporation, of Pittsburgh, Pa., is an example.

BRIEF DESCRIPTION OF THE PRESENT INVENTION

The levers heretofore referred to are, in practice, an assembly of several lever elements connected together to form a jaw assembly and there are two such assemblies, one opposite the other. They both have a common shaft as a fulcrum about which they pivot. The jaw portions of these assemblies each have a railhead gripping replaceable insert. As this insert wears, the amplitude of the arc through which the levers move increases. This, in turn, increases the vertical travel of the toggle pin.

First my invention provides a pawl and ratchet arrangement to rotate the fulcrum shaft in equal increments after each predetermined increase in the arc of travel of the levers as the inserts wear. This fractional rotation of the fulcrum shaft is transmitted to indicate on a readily visible graduated scale the total extent of rotation of the fulcrum shaft from the time when the inserts are first put into use to a place where the indicator has moved to that point on the scale that warns that replacement of the inserts is required.

Secondly, this invention has a series of alternately opposed eccentrics about which the lever elements of the assembly actually pivot, one set of eccentrics being engaged in the lever elements to the right of the axis of rotation of the fulcrum shaft and the alternate eccentrics are the pivots about which the left lever elements of the other jaw assembly pivot. The arrangement of the eccentrics is such that with each increment of rotation of the fulcrum shaft, the eccentrics will be rotated sufficiently to take up for the wear of the inserts that has occurred, whereby the arc through which the lever elements swing will be confined to a limited range.

A further improvement is in the provision of a manually operable screw to set and release the clamp if the hydraulic system fails. This screw, with a hand wheel at one end, has two sections, one of larger diameter than the other. Both are threaded in the same direction but the section of larger diameter has a slightly greater pitch than the one of the smaller section. Nuts on the two sections thus travel at different speeds but in the same direction, so that in releasing the clamp against the strong pressure of the springs, each full turn of the screw effects less than a full turn of compressive effort against the springs. In other words, this differential screw arrangement requires more turns to set the clamp than would oppositely pitched threads on the same shaft, as has heretofore been proposed, but with less manual effort to turn the screw.

The invention may be more fully understood by reference to the accompanying drawings showing a present preferred embodiment of my invention, but on a very much reduced scale, wherein:

FIG. 1 is a vertical transverse section looking toward the right in the plane of line II—II of FIG. 2, this section being at a plane where the assembly is seen largely in front elevation just behind the left supporting wheel seen in FIGS. 3, 4, and 5;

FIG. 3 is a view partly in side elevation and partly in vertical section, the part to the left of the center line being in section in the plane of line III—III of FIG. 2;

FIG. 4 is a horizontal section in the plane of line IV—IV of FIG. 3 looking downward, certain parts, however, being shown in plan, the view looking down on the main fulcrum shaft for the jaws;

FIG. 6 is a fragmentary section in approximately the plane of line VI—VI of FIG. 3 showing in elevation the indicator at the opposite end of the clamp structure from that shown in FIG. 1 which indicates the extent of wear of the rail clamp inserts;

FIG. 7 is a horizontal section in about the plane of line VII—VII of FIG. 1;

FIG. 8 is an enlarged transverse section in the plane of line VIII—VIII of FIG. 4 showing partly in elevation and partly in transverse section one of the clamping jaw elements with the eccentric between the shaft and the fulcrum shaft about which it rotates, the view also showing a portion of the contour of the clamping jaw elements in more detail than shown in FIG. 1;

Figure 2:
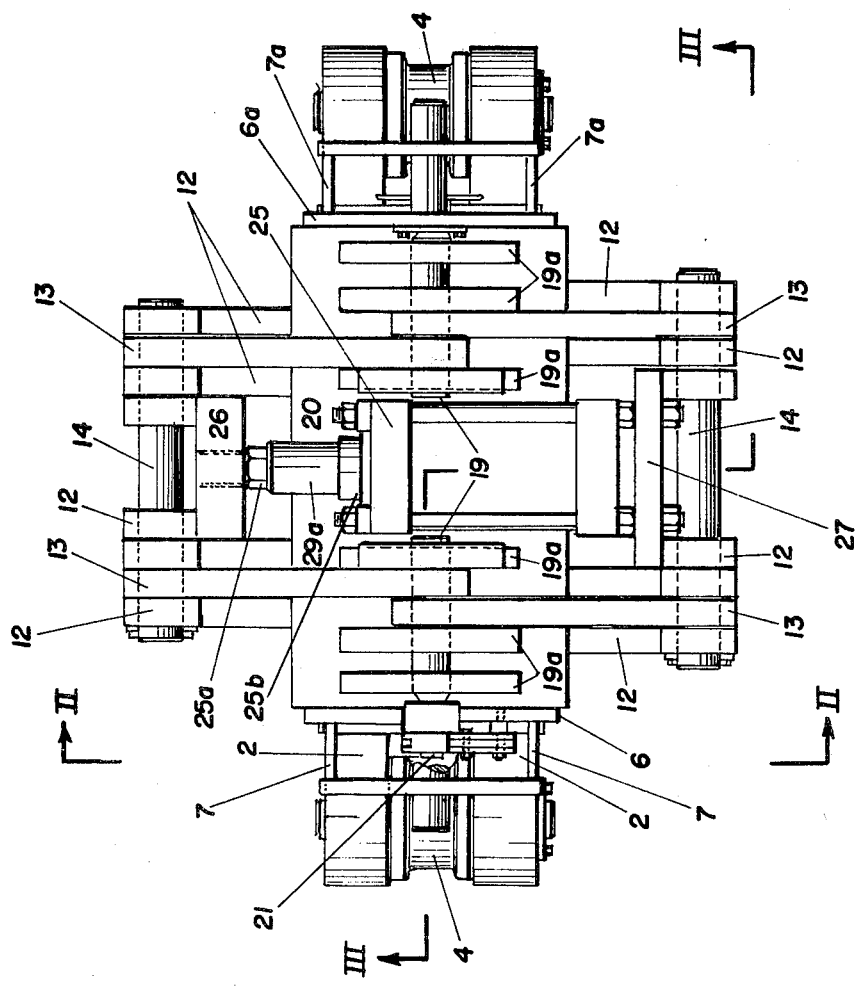
FIG. 2 is a top plan view of the complete clamp.

FIG. 9, for simplification of the general operation the foregoing figures have referred to the structure as comprising two jaw operating levers without detailed reference to their structure, and for clarity of illustration, the jaw assemblies are shown in phantom, with only the differential screw, the nuts, and the hand wheel being shown in full lines, the scale being larger than in FIGS. 1 to 3.

For a better understanding of the present invention a somewhat detailed description of a preferred form of automatic rail clamp is necessary. Referring first to FIGS. 1 to 3, A designates the clamp and B is a conventional steel rail showing its relation to the clamp. Commonly there are two parallel rails or perhaps pairs of rails, and the movable gantry has wheeled trucks that move over the rails. In some cases, more than one truck may be provided with an automatic rail clamp, but since the present invention relates to the clamp and not its relation to the truck or gantry, these parts have not been shown nor do the drawings disclose the hydraulic system which is also well known.

As previously indicated, equipment with which these clamps are used are commonly massive so that the clamps itself is rugged and heavy, and while carried on the equipment with which it is used, the clamp is constructed to also rest on and ride on the rail. Its massive construction may be compared to the size of the standard rail B in FIG. 1.

The body of the clamp as shown in the drawings comprises a generally rectangular platform 5. Secured to its opposite ends are like frame members comprising spaced parallel bars 2 and a cross piece 3. Each end frame has a flanged wheel 4 supported on a transverse axle extending between the bars 2. These frame members extend under the ends of and are connected by the bedplate or platform 5, the ends of which are spaced inwardly from the wheels 4.

At each end of the plate 5 are vertical end plates, the one at the left as seen in FIGS. 2 and 3 being designated 6 and the one at the other end is 6a. They are rigidly welded into place, and each has a spaced pair of parallel panels or wings thereon, one plate of each pair being equally spaced from a vertical center plane lengthwise of the platform and end frame. The panels at one end, the left end as viewed in FIG. 2, are designated 7 and 7a, respectively. Their main purpose is for bracing the vertical plates 6 and 6a.

Below the platform 5 there is a longitudinally extending shaft, hereinafter termed the lever-arm-fulcrum shaft, 8. It is supported in and passes through cross pieces 3 of the end frame fixtures and extends outwardly between the arms 2 of these pieces, but terminates short of the respective wheels 4. Shaft 8 also passes through and is supported about midway between its ends in a central bearing block 9 that is secured to the underside of plate 5.

The opposed clamping jaw assemblies are of like construction but placed in confronting relation to each other. In the drawings, as viewed in FIG. 1, 10 designates the assembly at the right, and 10a, the assembly at the left. Otherwise, the parts of the assemblies will herein be identified by like reference numerals.

Each assembly comprises four similar lever elements 12 arranged in two pairs, one part at each end of the assembly as viewed in FIGS. 3 and 4, with the lever elements 12 of each pair spaced from each other so that there is one end of a toggle link 13 between each pair of lever elements. The toggle links 13 have their outer ends connected with the upper ends of the respective lever elements by a common pivot pin 14 that extends through the upper ends of all four lever elements of the assembly and through the outer ends of the toggle links 13.

FIG. 4 shows a fragment of each lever element and it will be seen in FIG. 1 that two opposed lever or jaw elements 12 define a generally U-shaped contour, the single elements having a horizontal reach near their lower ends that extend under the platform 5 and an upwardly extending arm terminating around the pivot pin 14. The inner portion of the horizontal reach of each leverl element has an opening 15 (see FIG. 8) through which the common fulcrum shaft 8 passes.

Each lever or jaw element portion that extends below the level of the shaft 8 is formed with a shouldered recess in which the rail clamping insert 16 is removably carried by bolts 17 (FIG. 8) in a manner well known in the art, and, when badly worn, they may be replaced.

A rigid crossbar 18, of generally rectangular shape, connects each of the two pairs of lever elements of each assembly spaced slightly below the pivot pin 14 so that the entire assembly of the four lever elements of each jaw assembly are rigidly integrated into a single jaw unit or assembly. The jaw insert 16 extends across the lower portion of all four lever elements and a portion of one of them, shaded with vertical lines, is shown in FIG. 3.

The confronting ends of each pair of toggle levers or links 13 are connected to a central toggle pin 19 so that, as seen in FIGS. 2 and 3, there is one of these pins at each end of the jaw assembly. The toggle pins are carried in bearings 19a on a common vertically movable plate 20. Each toggle pin has an axial extension 21 thereon, and each extension has a roller 22 that is guided in a vertical slot 23 in its respective vertical end plate 6 or 6a.

There is a hydraulic cylinder and piston unit 25 extending crosswise of the assembly between the pivot pins 14 at the tops of the lever elements and outer end of the top toggle links. It is best seen in FIG. 2. The piston rod 25a of this assembly extends from the inner end of the cylinder 25b and connects through yoke 26 to the pin 14 of one of the opposing jaw assemblies while the cylinder has a yoke 27 at its outer end that connects it with the toggle pin 14 of the opposite jaw assembly.

The fluid pressure connection to the cylinder is not shown, being well known in this art and arranged to supply pressure fluid to the cylinder in such a manner that, when the gantry or like motors are powered to drive it from one place along the rails to another, the opposing jaw levers are pulled toward each other, and the rail clamp inserts, being on the same side of the fulcrum as their respective levers but below the axis of the fulcrum shaft (as distinguished from a pincer where the levers cross at the fulcrum), move in a shorter distance but equal arc away from the railhead to release the clamp from the railhead.

There are duplicate sets of three concentric coil springs confined between the base platform 5 and the toggle plate 20. Because of the small scale of the drawings, these two sets of concentric springs cannot be clearly shown, but they are known in the art. One set is indicated in the sectional view at the left end of FIG. 3 by the three progressively smaller pairs pf vertical parallel broken lines at each side of a clear central area and with the series of graduated half circles at the top and bottom of each set of parallel lines. The spaces between these pairs of lines are marked with a capital letter "S" above and below which are oppositely pointed vertical arrows. Depending side plates 28 along each edge of the toggle plate 20 (see FIG. 1) telescope over side plates 31 extending along the side walls of platform 5 in combination with the end plates 6 and 6a providing an enclosure for the spring assemblies that will exclude foreign objects and provide weather protection for the springs.

When the fluid pressure cylinder 25 is energized, it will move the upper ends of the lever elements toward each other to release the clamp from the railhead and the toggle links will act to force the toggle plate 20 down, compressing the confined springs S. When pressure in the cylinder 25 drops, these springs will urge the toggle plate 20 upwardly to spread the clamp lever assemblies and set the clamp against the sides of the railhead.

The foregoing describes one well known type of rail clamp. Another type reverses the arrangement in that the toggle mechanism and springs are inverted with respect to the structure herein described so that the springs, for example, are above the toggle plate, etc. As previously explained, the rail clamp inserts are subject to relatively rapid wear. There is nothing to indicate how much wear has taken place or to guide one in adjusting the insert holding screws to compensate for wear. One has difficulty in determining when an insert has become so worn that replacement is required. The present invention automatically adjusts for wear and provides a readily visible indicator showing the extent of wear.

To accomplish these functions advantage is taken of the fact that, as the inserts wear away, the clamping jaws must have a greater arcuate movement to bring the jaw inserts into contact with the railhead in setting the clamp. This, in turn, results in an increase in the up and down travel of the toggle pins 19, so that the toggle pin extensions 21 on which are the guide rollers have a greater vertical travel in their guide slots 23 in the fixed end plates 6 and 6a.

With the present invention there is a depending link 30 on the end of one of the toggle pin extensions 21. The link 30, best seen in FIG. 1, and less clearly seen in the drawings at the left end of the clamp as viewed in FIGS. 2 and 3, has its lower end pivotally connected to a lever 31 pivotally mounted on the fixed end plate 6 at 32, as seen in FIG. 7.

The lever 31 is thus rocked up and down in a vertical arc about its pivot or fulcrum 32 on the fixed end plate 6. This up and down motion of the lever 31 is transmitted through pivot plates 33a and pivot pin 33 to a downwardly extending push rod 34, but since the pivotal connection 33 of the push rod to the lever 31 is between link 30 and fulcrum 32, the extent of up and down travel of the push rod is to a predetermined extent less than the full up and down travel of the toggle pin. Thus, the longer the vertical travel of the toggle pins due to wear of the clamping jaw elements, the greater will be the up and down travel of the push rods.

Figure 5:
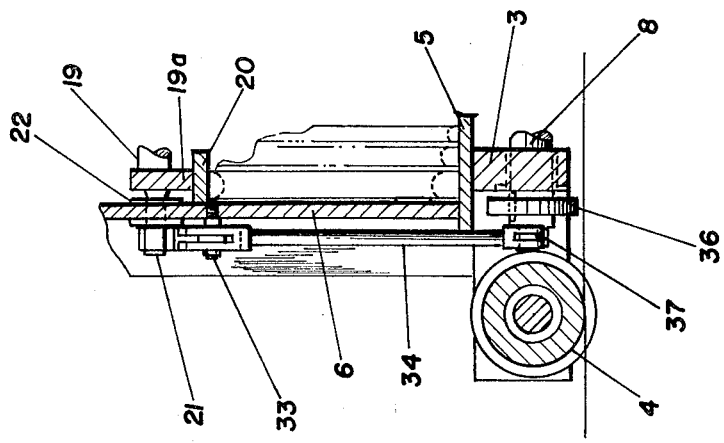
FIG. 5 is a fragmentary transverse vertical section in the plane of line V—V of FIG. 1 showing in side elevation the push rod with its pawl and ratchet wheel on the main fulcrum shaft for the jaws.

As best seen in FIGS. 1, 3 and 5, one projecting end of the lever-arm-fulcrum shaft 8, also at the left end as seen in the drawings, has a ratchet wheel 36 with teeth around at least a portion, and preferably only a portion, of the periphery of the wheel. These teeth, extending about only 180° of the periphery of the wheel, are a series of ratchet teeth, twenty being indicated in the drawing engaged by pawl 36a. Fixed on the extreme end of the lever-arm-fulcrum shaft there is a standard commercial type ratchet 37 having a pin 37a which engages the push rod 34. The push rod 34 reciprocates this commercial ratchet, but until the vertical travel of the push rod exceeds a predetermined distance, the commercial ratchet 37 simply moves too small of an angle to slip a ratchet tooth. However, when and only when the vertical travel of the push rod is great enough due to wear of the rail clamp inserts for the pawl in the commercial ratchet to clear one ratchet tooth and engage the next, will the ratchet be engaged sufficiently to rotate the lever-arm-fulcrum shaft through an arc corresponding to the increment of arc between one tooth and the next of the commercial ratchet less any lost motion. The lost motion is provided in the push rod linkage assembly through appropriate tolerances of fit of the linkage elements to assure that the clamp jaws are released before the lever arm fulcrum shaft is rotated. The ratchet wheel 36 and pawl 36a then assure that the lever-arm-fulcrum shaft does not rotate back under loading. In the example here shown with twenty ratchet teeth, each increment of rotation of the shaft is one twentieth of the acceptable life of the clamp insert, and the total of twenty teeth, as here used as an example, is equal to one half of one revolution of the lever-arm-fulcrum shaft 8.

On the projecting opposite end of the lever-arm-fulcrum shaft 8 there is fixed a small sprocket wheel 40 (see FIG. 6). Rotatably supported on the outer face of the end wall 6a there is a sprocket wheel 41 directly above sprocket wheel 40. A sprocket chain 42 transmits turning motion of the lever arm fulcrum shaft and sprocket 40 to the sprocket wheel 41, but because of the greater diameter of sprocket 41, it moves through a lesser arc with each increment of rotation of the shaft 8 and sprocket 40. Wheel 41 has at the back thereof a pointer 42 that moves with rotation of wheel 41 in front of an indicator scale 43 on the outerface of vertical plate 6a. This pointer moves between a mark at one end of the scale showing the start with new inserts to a point marked "replace inserts." The position of the pointer between these two points shows the extent of wear of the inserts and indicates when renewal should be made.

In addition to indicating in this manner the extent of wear that has taken place and when the inserts should be replaced, the invention also utilizes the step-by-step rotation of the lever-arm-fulcrum shaft 8 to automatically take up and compensate for this wear as it develops, thereby eliminating manual adjustment of the inserts, which perhaps is often neglected. To this end, the lever-arm-fulcrum shaft is provided with opposed eccentrics, 180° out of phase, about which the lever elements of the opposed jaw elements pivot.

More specifically, the shaft 8 is formed to provide a series, as here illustrated, of four eccentrics at each of two locations, one near one end of the shaft where there are four lever elements fulcrumed on the shaft and the other series being similarly arranged and located near the other end. As shown in FIG. 4, the lever elements 12 are slightly offset by the eccentrics. The true rotation of shaft 8 is about an axis designated C while the levers themselves pivot on an eccentric, indicated by the numeral 50. The eccentrics provide a pivotal axis for the levers 12 which continually adjust the fulcrum point of the levers to correct for wear of the rail clamping insert 16. The small scale of the assembly drawings make it necessary to exaggerate the two series of opposed eccentrics on the shaft 8 in FIG. 4.

Considering both FIGS. 4 and 8, the shaft 8 has brass bushings 53 on which it is mounted for rotational movement within crosspieces 3 and central bearing block 9. Each lever 12 is also provided with a brass bushing 51 mounted within lever opening 15. Due to the method of manufacture and the construction of shaft 8, the lever openings 15 must be of sufficient size to permit the lever to slide onto the shaft for proper positioning on an eccentric. The clear space in these figures represents the gap between a part of the eccentric 50 and bushing 51. Because of the concentric springs which urge the levers against the rail, the lever is biased to prevent any rocking motion about the shaft which might ordinarily be incidental to this method of mounting.

To properly position the lever on a specific eccentric, a biasing screw 52 is mounted within the lever. This screw 52 urges the lever out away from the shaft in the same direction in which the springs would normally bias it. During the normal operation of the rail clamp, as previously described, the biasing screw 52 would not be in contact with the shaft eccentric 50.

In FIG. 8 there is a somewhat schematic view in which C designates the true axis of rotation of the shaft 8. The center, for example, of one eccentric is indicated at c' and it is about this eccentric that the right jaw assembly shown in FIG. 8 actually pivots. The center of the opposite eccentric for the lever elements of the left clamping jaw is designated c". The positions of the parts as shown in FIG. 8 illustrate the starting position before any wear of the inserts has taken place. At this time, the eccentric, cross-hatched to be plainly seen, has an axis of rotation c' which is to the right of the true axis C of rotation of the shaft 8. Additionally, the clear area to the right of c' indicates the gap between the bushing 51 and eccentric 50 as previously described.

As the inserts wear, the amplitude of the arc through which the jaws rock increases. It has been explained that this increase in amplitude operates through the toggle, push rod and commercial ratchet 37 previously described until it is great enough to cause the commercial ratchet to slip one tooth, whereupon the fulcrum shaft 8 will rotate one increment of arc during the opening of the clamp after the commercial ratchet 37 slips the tooth. In FIG. 8 this rotation will be in a clockwise direction. As a result of this, the center c' of the eccentric moves clockwise in an arc with respect to the center of rotation C of the shaft 8, moving the center of the eccentric offset progressively as here shown toward the left, that is, toward the other side of the true center of rotation of the shaft 8 to thereby shift the axis about which the jaw lever fulcrums progressively toward the left with the increasing wear of the insert. The eccentrics for the left jaw levers are just 180° opposed to the ones for the right and the wear of the inserts in the left and right jaws will occur at about the same rate so the simultaneous opposite change in eccentricity for the left and right lever fulcrums is desirable.

The eccentrics in the shaft 8 may therefore be characterized as two groups of eccentrics, one group being near each end of the shaft with alternate eccentrics being 180° out of phase with the intervening eccentrics of the same group. Thus, as the shaft 8 is rotated in increments as a result of increasing wear of the inserts, the pivotal axes of the jaws are adjusted to maintain the amplitude of their oscillation within an acceptable range.

Reference has heretofore been made to the massive construction of an automatic rail clamp for the purpose for which they are designed. It will therefore be appreciated that very strong springs S are required to set the clamp and, of course, fluid pressure in the cylinder and piston unit must be great enough to overcome these springs to release the clamp after it has been set. The machines on which the rail clamp is used may not be safely used if the clamp is not set against even slight unwanted change in its position, nor can the machine be used if the clamp is set at the time the machine is required to be moved. The greater difficulty usually occurs in releasing the clamp if the hydraulic pressure to the cylinder fails. In this case the clamp must be manually opened against the resistance of the springs S. To overcome this difficulty, there is a hand wheel and screw arrangement designated 60 and 61, respectively, the general location of which is indicated in FIG. 1, but the view of which is largely concealed by other parts of the clamp. Its location in a plane at right angles to FIG. 1 may also be seen at the half circle in the part of FIG. 3 that is in elevation and not in the half of the screw 61 shown in section.

FIG. 9, however, shows somewhat diagrammatically the entire screw with the parts with which it cooperates, other than the two nuts that are moved by the screw, indicated in phantom. The hand wheel 60 is fixed to one end of the screw 61. The screw has a portion of its length to which the hand wheel is fixed, designated 61a, of a larger diameter than the remaining portion 61b of the screw. The portion 61a of larger diameter passes through the corresponding bar 18 of the opposite jaw assembly 10a. The portion 61a has a triple pitch right-hand thread with a 0.5" lead. The smaller diameter portion of the screw has a triple pitch right-hand thread of a lesser lead of 0.47". There is a nut 62a with an inner convex surface seated in a conforming cavity on the outer face of the bar 18 of assembly 10a through which the larger screw portion 61a passes. There is a similar but oppositely facing nut 62b on the portion of the smaller diameter, 61b, of the screw.

Let it be assumed that the hydraulic pressure system fails, and the clamp, under the pressure of the springs S, is set so that the apparatus cannot be moved. The manual screw must therefore be used to pull the upper ends of the clamping jaws toward each other to release the clamp. This must be done, however, against the resistance of the springs which push upwardly against the plate 20 to oppose the downward travel of the toggle pins.

By turning the hand wheel to move the nut 62a to the right, pressure is applied to the jaw levers at the left as viewed in FIG. 9. However, the nut 62b will move in the same direction but at a lower speed. Hence, each turn of the wheel brings the upper ends of the levers closer together but with much less physical effort than if the two levers were moved by opposed threads on the screw toward each other or if one alone moved. The effect of the differential screw is comparable to lifting a load with a rope and pulley in that the load on the rope moves half as far as the opposite end of the rope which one is pulling, but the load is lifted more easily.

To set the clamp, the springs, of course, act in conjunction with the screw to spread the upper ends of the jaw levers and much less manual effort is required but the force of the springs is exerted through the differential travel of the two jaws to more gradually and more effectively oppose the pressure of any residual fluid in the hydraulic system.

By visibly indicating the extent of wear of the clamp inserts as it occurs at a readable location by automatically adjusting the clamp as such wear occurs to compensate for the wear, and by the provision of the differential hand screw arrangement for setting the clamp when the hydraulic system fails, important improvements are made with very small changes in the construction of the clamp as presently manufactured. Obviously, these improvements are applicable to other forms of automatic rail clamps where, for example, the springs are located above the lever assemblies, since the location and function of the fulcrum shaft are not changed and toggle links are inverted but, nevertheless, their range of movement increases as the jaw inserts become worn, so that the added elements herein disclosed may be adapted to rail clamps of such construction, as well as to the clamp herein specifically disclosed as the preferred embodiment. An additional benefit obtained from this invention is the ability to operate at a more advantageous position of the toggle since the automatic adjusting feature can be used to prevent the toggle angle from going flat as the insert wear increases.

I claim:

1. In an automatic rail clamp having a supporting frame and confronting rail gripping jaw assemblies, one of which is at one side of the frame and the other at the opposite side of the frame, both jaw assemblies being fulcrummed to rotate about a common fulcrum shaft supported on the frame in a vertical plane midway between the two jaw assemblies in a direction parallel with the length of the rail to be gripped between them, each jaw assembly having a plurality of lever elements rotatably mounted one after the other along the common fulcrum shaft with the lever elements providing jaw portions located below said common fulcrum shaft and lever arms extending laterally and upwardly from said common fulcrum shaft for connection with operating means carried by the frame, the jaw portions of said plurality of lever elements of each jaw assembly having a common railhead gripping insert fixed thereto in such manner that when the lever arms of said two jaw assemblies are spread apart by said operating means, said inserts move toward each other to grip opposite sides of a railhead and, when said lever arms of the two assemblies are moved toward each other, the respective inserts move away from the railhead to release the grip of the jaw assemblies, the invention comprising:

(a) means mounting said common fulcrum shaft in the frame for rotation about its own axis, (b) means for permitting rotation of the common fulcrum shaft in one direction and holding it against rotation in the opposite direction, (c) means rotating said common fulcrum shaft through an arcuate increment of rotation when the amplitude of movement of the lever arms exceeds a predetermined amount as said gripping inserts wear thinner with repeated operations of the clamp; and (d) adjustment means responsive to each increment of rotation of said common fulcrum shaft for adjusting the relative position of said jaw assemblies to accommodate for the wear on said inserts and to reduce the amplitude of movement of the lever arms so that the common fulcrum shaft is not incrementally rotated again until the inserts have worn sufficiently to cause the amplitude of movement of the lever arms to again exceed said predetermined amount, said adjustment means including, two series of eccentrics on the common fulcrum shaft offset from the axis of rotation thereof, the eccentrics of one series being 180° out of phase with those of the other series, said eccentrics being positioned one after the other along the common fulcrum shaft with the lever elements of one jaw assembly being fulcrummed about the eccentrics of one series and the lever elements of the other jaw assembly being fulcrummed about the eccentrics of the other series in such manner that with each increment of rotation of the common fulcrum shaft, the eccentrics shift the centers of rotation of the lever elements on their respective fulcrums in opposite directions with respect to the axis of rotation of the common fulcrum shaft.

2. The invention defined in claim 1 including an indicator connected to the common fulcrum shaft to cumulatively show the total extent of rotation of the common fulcrum shaft with successive increments of rotation and thereby indicate the extent of wear of the inserts and adequately in advance signal the need for replacement of the inserts.

3. The invention defined in claim 2 in which said indicator comprises a pointer arranged to be advanced in one direction by the successive increments of rotation of the fulcrum shaft, and a graduated scale fixed with respect to and relative to which the pointer moves, the pointer and the scale being located on the frame at a location removed from the shaft and accessible for viewing at all times the clamp is in use.

4. The invention defined in claim 3 in which the successive increments of rotation of said shaft is transmitted to the indicator through sprocket chain gearing with the indicator being at level well above the top of the rail over which the brake is positioned.

5. The invention of claim 1 wherein said operating means includes spring means effective through toggle levers to spread the lever arms of the two jaw assemblies to move said inserts into gripping engagement with the railhead and fluid pressure cylinder and piston means operating through said toggle levers in opposition to said spring for moving said inserts away from the railhead to release the grip of the jaw assemblies, whereby the rail clamp will automatically operate to grip the railhead upon controlled or accidental loss of pressure to the cylinder and piston means, said combination including a threaded shaft passing through both jaw assemblies and having a handwheel on one end thereof accessible at the outside of the jaw assemblies, the threaded shaft having a portion of its length which passes through one jaw assembly of greater diameter than the portion thereof which passes through the other jaw assembly, both of said portions being threaded with the threads on both portions having the pitch in the same direction but the lead of the pitch on the portion of larger diameter being greater than the lead of the thread on the smaller diameter, the threaded portions of the shaft passing freely through the respective jaw assemblies and a nut on each of said threaded portions bearing against the outer face of its respective jaw assembly so that as the screw is turned to move the nut of the portion of larger diameter against the spring pressure to force the jaws assemblies into rail releasing position when the hydraulic cylinder cannot provide adequate pressure to release the clamp, the nut on the portion of smaller diameter with such turning of the screw then acting to relieve resistance of the spring but at a slower rate than the first nut operates to oppose spring pressure whereby the effort required to manually turn the hand wheel to release the clamp against spring pressure is reduced by reason of the differential travel of the two nuts in the same direction.

6. The invention of claim 1 wherein said means for permitting rotation of the common fulcrum shaft in one direction and holding it against rotation in the opposite direction include a ratchet wheel mounted on the common fulcrum shaft and a pawl which engages said ratchet wheel.

7. The invention of claim 6 wherein the teeth on said ratchet wheel extend around no more than 180° of its periphery whereby said common fulcrum shaft and therefore said eccentrics can be rotated no more than 180° by said means for rotating the common fulcrum shaft.

8. The invention of claim 1 or 6 wherein said lever arms of the confronting jaw assemblies are connected by opposed toggle links pivotally connected at their distal ends to the lever arms and having confronting ends pivotally connected with each other through connecting pin means that moves vertically with the closing and opening of the jaw assemblies and wherein said means for rotating said common fulcrum shaft include a push rod having an upper end connected with said pin means to move vertically therewith, and means operated by the push rod arranged to rotate the common fulcrum shaft through said arcuate increment only when vertical travel of the push rod exceeds a predetermined range and wherein said adjustment means in adjusting the relative positions of said jaw assemblies reduces the vertical travel of said push rod within a range such that the push rod will not rotate the common fulcrum shaft through another increment of arc until predetermined additional wear of the inserts has occurred.

9. The invention of claim 8, wherein the means operated by the push rod is ratchet lever means mounted on the common fulcrum shaft for movement in an arc about the common fulcrum shaft as a center, said ratchet lever means being arranged to slip on a tooth thereof on each up and down cycle of the push rod until the up and down travel of the push rod exceeds said predetermined range due to wear of the jaw inserts whereupon the next tooth of the ratchet lever means is engaged so that upon the following jaw opening motion of the lever elements the common fulcrum shaft is rotated through said arcuate increment.

* * * * *